United States Patent [19]

Boberski et al.

[11] 4,328,033

[45] May 4, 1982

[54] CURABLE SILICATE COMPOSITION CONTAINING METAL CONDENSED PHOSPHATE HARDENER COATED WITH REACTION PRODUCT FROM A METAL ALUMINATE AND/OR A METAL BORATE

[75] Inventors: William G. Boberski, Gibsonia; Peter M. Nowakowski, Glenshaw; Jerome A. Seiner, Pittsburgh, all of Pa.

[73] Assignee: PPG Industries, Inc., Pittsburgh, Pa.

[21] Appl. No.: 259,870

[22] Filed: May 4, 1981

[51] Int. Cl.$^3$ ............................................... C09D 1/02
[52] U.S. Cl. ........................................ 106/74; 106/84
[58] Field of Search ...................................... 106/74, 84

[56] References Cited

U.S. PATENT DOCUMENTS

| | | | |
|---|---|---|---|
| 3,625,722 | 12/1971 | Freyhold et al. | 106/74 |
| 3,669,699 | 6/1972 | Doi et al. | 106/74 |
| 3,930,876 | 1/1976 | Nakajima et al. | 106/74 |
| 4,075,031 | 2/1978 | Allen | 106/300 |

*Primary Examiner*—James Poer
*Attorney, Agent, or Firm*—Thomas M. Breininger

[57] ABSTRACT

Disclosed is an aqueous curable composition comprising:

(A) a water-soluble and/or water-dispersible silicate; and
(B) a metal condensed phosphate hardener, the metal condensed phosphate hardener comprising a core of metal condensed phosphate and a coating on the core comprising a reaction product of a metallate and acid; and
(C) water.

Also disclosed are methods of preparing the compositions of the invention.

21 Claims, No Drawings ns and resins arts to develop curable compositions from which organic solvents have been eliminated or at least substantially reduced. Moreover, the high cost and scarcity of petroleum by-products has generated interest in the development of curable compositions based entirely, or at least substantially, on inorganic components.

Inorganic coating compositions based on alkali metal silicates and inorganic phosphate hardeners are known. However, when alkali metal silicates and inorganic phosphate hardeners are mixed, they tend to rapidly coagulate, solidify or the like due to the strong reactivity between the silicate and the phosphate. Thus compositions based on alkali metal silicates and metal phosphate hardeners tend to have relatively short useful lives. Additionally, due to this strong reactivity, generally known alkali silicate-phosphate hardener compositions generally contain undesirable particles or lumps. Such particles or lumps interfere, for example, in spraying applications employing compositions containing these particles or lumps. Furthermore, cured coatings produced from such compositions contain highly undesirable lumps.

Applicants' copending application Ser. No. 218,861 filed Dec. 22, 1980 discloses an aqueous curable composition containing an alkali metal silicate and an aqueous dispersion of a condensed metal phosphate hardener containing an amount of base sufficient to raise the pH of the hardener dispersion to a value greater than 9.5. Such compositions containing the specified amount of base cure to smooth, especially lump free, durable coatings. Another of applicants' copending applications filed even date herewith discloses a metal condensed phosphate coated with a reaction product of a metallate and acid. The application also discloses methods for producing such a coated, metal condensed phosphate.

SUMMARY OF THE INVENTION

The present invention provides for a curable composition comprising a water-soluble and/or water-dispersible silicate and a metal condensed phosphate hardener coated with a reaction product of a water-soluble and/or water-dispersible metallate and acid. The water-soluble and/or water-dispersible metallate is selected from the group consisting of a metal aluminate and a metal borate. The present invention also provides a method for preparing such a composition.

DETAILED DESCRIPTION OF THE INVENTION

The present invention provides for an aqueous curable composition comprising:

(A) from about 10 to about 45 percent, preferably from about 10 to about 32 percent, and most preferably from about 15 to about 25 percent by weight of a water-soluble and/or water-dispersible silicate;

(B) from about 2 to about 32 percent, preferably from about 2 to about 10 percent, and most preferably from about 8 to about 10 percent by weight of a metal condensed phosphate hardener, the metal condensed phosphate hardener comprising a core of metal condensed phosphate and a coating on the core comprising a reaction product of a water-soluble and/or water-dispersible metallate and acid; and (C) water. The metallate is selected from the group consisting of a metal aluminate, a metal borate, and a mixture thereof. A water-soluble metal aluminate is preferred. The amount of reaction product of metallate and acid ranges from about 0.1 percent to about 50 percent, preferably from about 1 to about 15 percent by weight based on the combined weight of the metal condensed phosphate and the aforementioned reaction product. The balance of the aqueous curable composition comprises water and, where desired, generally known pigments, fillers, additives or mixtures thereof. The amount of water in the compositions of the invention may vary widely depending on the intended use. Generally, the aqueous phase of the compositions of the invention contains up to 90 percent by weight water, typically from about 42 percent to about 64 percent by weight water, and preferably from about 50 percent to about 60 percent by weight water. The water in component (C) above includes all water in the aqueous curable composition from any source. For example, the water in component (C) is intended to include the water present in generally known aqueous alkali silicates typically used in the present invention and also water present in aqueous dispersions of metal condensed phosphate typically used in the present invention.

The core of metal condensed phosphate may be any metal condensed phosphate generally known for use in silicate-based inorganic paints or coating compositions. The metal condensed phosphate may be prepared, for example, by dehydration of one or more orthophosphates at about 300° to about 1200° C. For example, condensed aluminum phosphate may be prepared by evaporating an aqueous 30 percent by weight Al(H$_2$PO$_4$)$_3$ solution to dryness and heating the resulting material to a temperature of about 400° C. to 500° C. Another example of a method of preparation of a condensed aluminum phosphate, described in U.S. Pat. No. 3,943,231, is to spray-dry a relatively dilute solution or suspension of an aluminum orthophosphate containing P$_2$O$_5$ and Al$_2$O$_3$ in the molar ratio desired in the final product at temperatures higher than 250° C. to effect direct transformation into condensed aluminum phosphates. German Pat. No. 1,252,835 describes a method for obtaining condensed aluminum phosphates wherein an aluminum phosphate solution is evaporated to dryness and the resulting material subjected to a two-step heat treatment at different temperatures. Finally, methods for preparing condensed iron phosphates and condensed aluminum phosphates are described in the Bulletin of the Societe Chemique deFrance, article No. 37, (1961), pages 2277–2282 and the Bulletin of the Societe Chemique deFrance, article No. 221, (1962), pages 1237–1243.

Metal condensed phosphates used as the core in the present invention typically comprise condensed aluminum phosphates. Various condensed aluminum phosphates, including their methods of preparation, are described, for example, by d'Yvoire in the Bulletin of the Society Chemique deFrance, (1961), article No. 337, at 2277–2282 and the Bulletin of the Societe Chemique deFrance, (1962), article No. 221 at 1237–1243 wherein a cyclic aluminum tetrametaphosphate, (i.e., the A-form of Al(PO$_3$)$_3$) and four long-chain polyphosphates (i.e., the B-, C-, D- and E-forms of Al(PO$_3$)$_3$) are identified. As reported by d'Yvoire, these condensed aluminum phosphates may be produced, for example, by reacting P$_2$O$_5$ and Al$_2$O$_3$ in a molar ratio respectively of from 4:1 to 15:1. U.S. Pat. No. 4,216,190, hereby incorporated by reference, describes a method for making B-form aluminum trimetaphosphate by the addition of concentrated ammonium hydroxide to a solution of aluminum dihydrogen phosphate, Al(H$_2$PO$_4$)$_3$, to effect the formation of a white precipitate which is directly converted to the B-form aluminum trimetaphosphate, Al(PO$_3$)$_3$, by a single elevated temperature treatment.

When a condensed aluminum phosphate is used as the core in the present invention, it generally comprises a linear condensed aluminum phosphate, namely one or more of the long-chain polyphosphates (i.e., the B-, C-, D- and E-forms of Al(PO$_3$)$_3$). Also, a mixture of A-form aluminum metaphosphate with one or more of the long-chain aluminum polyphosphates (i.e., the B-, C-, D- and E-forms of Al(PO$_3$)$_3$) may be used in the present invention as the core of condensed metal phosphate. When a mixture comprising A- and B-form aluminum metaphosphates is used as the core, the weight ratio of the B-form to A-form aluminum metaphosphate generally ranges from about 3:5 to about 4:1, preferably from about 7:3 to about 4:1.

In accordance with the present invention, the coating on the core of condensed metal phosphate used in the compositions of the present invention comprises a reaction product of acid and a water-soluble and/or a water-dispersible metal aluminate or metal borate. A mixture of metal aluminate and metal borate, of course, is considered to be within the scope of the present invention. The acid may be any acid suitable for applying the coating to the core of metal condensed phosphate in accordance with the invention. The metal condensed phosphate in a dispersion of metal condensed phosphate tends to make the dispersion acidic. The reaction of the acid inherently present in such a dispersion of metal condensed phosphate with aqueous metallate, even without addition of any further acid, preferably is used to apply the coating to the core of metal condensed phosphate. For example, in a preferred embodiment, the dispersion of metal condensed phosphate is combined with aqueous metal aluminate without the addition of any further acid. However, an additional acid or mixture of acids can be combined with the metal condensed phosphate and aqueous metal aluminate to apply the coating to the metal condensed phosphate. Examples of suitable additional acids include: phosphoric acid, sulfuric acid, hydrochloric acid, hydrobromic acid, hydriodic acid, nitric acid, perchloric acid, chloric acid, methane sulfonic acid, ethane sulfonic acid, trichloroacetic acid, and trifluoroacetic acid. When such additional acid is used phosphoric acid is preferred.

The metallate suitable for preparing the coated metal condensed phosphate may be any water-soluble and/or water-dispersible metallate or mixture of metallates selected from the group consisting of metal aluminates and metal borates. Metal aluminates, particularly water-soluble metal aluminates are preferred. When metal borates are used to prepare the coated metal condensed phosphates, water-soluble metal borates are preferred. Examples of suitable metal aluminates include sodium aluminate, potassium aluminate and calcium aluminate. Typically sodium aluminate is used. A typical sodium aluminate solution useful for preparing a coated condensed metal phosphate may be prepared by dissolving enough sodium aluminate in water to obtain about a 30 to 40 percent by weight sodium aluminate solution. Where desired, metal aluminate solutions of higher or lower concentration than 30 to 40 percent by weight may be used. Examples of suitable metal borates include sodium metaborate, potassium metaborate, sodium tetraborate, and potassium tetraborate. When a metal borate is used in the invention, typically sodium borate is used.

Aqueous curable silicate compositions containing any metal condensed phosphate comprising a core of metal condensed phosphate and a coating on the core comprising a reaction product of acid and a metallate selected from the group consisting of metal aluminate, metal borate and a mixture thereof, and acid, however the coating is applied, is considered to be within the scope of the present invention. Some typical procedures for coating the metal condensed phosphate will be described.

In a first procedure for coating the metal condensed phosphate, an aqueous slurry of the metal condensed phosphate, an aqueous metal aluminate, and an additional acid as previously described are combined so as to maintain the pH of the slurry in a range of from about 4 to about 10, typically from about 6 to about 8, while maintaining the temperature of the slurry in a range of from about 25° C. to about 95° C., preferably from about 50° C. to about 95° C., and most preferably from about 80° C. to about 95° C. In this procedure the aqueous metal aluminate typically is slowly added to the aqueous slurry of metal condensed phosphate. However, the addition of the aqueous slurry of metal condensed phosphate to the aqueous metal aluminate also may be employed. The additional acid such as those described previously typically is slowly added to the slurry of metal condensed phosphate during at least part of the addition of the aqueous metal aluminate.

Although the coated metal condensed phosphate may be prepared using an aqueous slurry of metal condensed phosphate at room temperature, typically, in the first procedure, the aqueous slurry of metal condensed phosphate initially is heated to a temperature ranging from about 50° C. to about 95° C., preferably from about 80° C. to abot 95° C., and the pH of the slurry is adjusted to a pH generally ranging from about 4 to about 10, typically ranging from about 6 to about 8, before combining the aqueous slurry of metal condensed phosphate with the aqueous metal aluminate. This initial pH adjustment may be carried out concurrently with or separately from the heating step. Typically the slurry of metal condensed phosphate is heated while the pH is adjusted. The adjustment of pH as described above facilitates mixing of the metal condensed phosphate with the aqueous metal aluminate by increasing the fluidity of the aqueous metal condensed phosphate.

The initial adjustment of the pH of the slurry of metal condensed phosphate in the above procedure can be carried out using an aqueous alkali hydroxide such as sodium or potassium hydroxide. However it is preferred to initially adjust the pH of the slurry of metal condensed phosphate using a basic, water-soluble metal aluminate itself.

To the above slurry of metal condensed phosphate, the aqueous metal aluminate slowly is added, at least in part along with the additional acid, so as to maintain the pH in the range of from about 4 to about 10, typically from about 6 to about 8, and while maintaining the temperature in the range of from about 25° C. to about 95° C., preferably from about 50° C. to about 95° C., and most preferably from about 80° C. to about 95° C. The amount of metal aluminate will be determined by the desired weight of the reaction product to be deposited on the metal condensed phosphate, generally an amount sufficient to provide a coating on the metal condensed phosphate ranging from about 0.1 percent to about 50 percent by weight, typically from about 1 percent to about 15 percent by weight, based on the combined weight of the metal condensed phosphate and the coating. The amount of additional acid typically added in this procedure is that amount to maintain the pH in the previously described range. It is believed that when the additional acid is employed with the aqueous metal aluminate to coat the metal condensed phosphate, at least part of the coating on the condensed phosphate, and probably a substantial part, results from the reaction of the metal aluminate with the additional acid.

Near the end of the addition of the aqueous metal aluminate to the aqueous slurry of metal condensed phosphate, if desired, the addition of acid may be stopped so that the pH of the slurry after the addition of the metal aluminate will range from about 7.5 to about 8.0. Alternately, if acid is added concurrently with the metal aluminate until all the metal aluminate has been added, and if the pH is then not in the range of from about 7.5 to about 8.0, where desired, a base such as aqueous alkali hydroxide may be added to raise the pH into the range of from about 7.5 to about 8.0.

In a preferred second procedure for coating the metal condensed phosphate, the aqueous metal aluminate, preferably in the form of a solution, simply is slowly combined with the aqueous slurry of metal condensed phosphate so that the pH of the slurry during the combination varies within a range of from about 4 to about 10. No additional acid is combined with the aqueous slurry of metal condensed phosphate and the aqueous metal aluminate in this particular procedure for coating the metal condensed phosphate. The aqueous metal aluminate is combined with the aqueous slurry of metal condensed phosphate while maintaining the temperature of the slurry in a range of from about 25° C. to about 95° C., preferably from about 50° C. to about 95° C., and most preferably from about 80° C. to about 95° C. In this procedure the coating on the metal condensed phosphate is believed to be at least in part the reaction product of the metal aluminate and acid from the acidic metal condensed phosphate itself. As in the previously described first procedure, the amount of metal aluminate employed will be determined by the desired weight of the reaction product to be deposited on the metal condensed phosphate, generally an amount sufficient to provide a coating on the metal condensed phosphate ranging from about 1.0 percent to about 50 percent by weight, typically from about 1 percent to about 15 percent by weight, based on the combined weight of the metal condensed phosphate and the coating.

Although the coated metal condensed phosphate may be prepared using an aqueous slurry of metal condensed phosphate at room temperature, typically in this second procedure, the aqueous slurry of metal condensed phosphate initially is heated to a temperature ranging from about 50° C. to about 95° C., preferably from about 80° C. to about 95° C. As in the previously described first procedure, the pH of the slurry of metal condensed phosphate typically is adjusted to a pH ranging from about 4 to about 10, usually from about 6 to about 8, while the slurry initially is heated to the aforementioned temperature range. This initial pH adjustment of the slurry of metal condensed phosphate can be carried out using an aqueous alkali hydroxide or, preferably, using a basic, water-soluble metal aluminate itself.

In a third procedure for coating the metal condensed phosphate, an aqueous slurry of the metal condensed phosphate, an aqueous metal borate, and an additional acid as previously described are combined according to the methods set forth in the description of the first procedure above except that an aqueous metal borate, typically aqueous sodium metaborate, is substituted for the aqueous metal aluminate in the first procedure.

In a fourth procedure for coating the metal condensed phosphate, an aqueous metal borate preferably in the form of a solution, simply is slowly combined with the aqueous slurry of metal condensed phosphate so that the pH of the slurry during the combination varies within a range of from about 4 to about 10. No additional acid is combined with the aqueous slurry of metal condensed phosphate and the aqueous metal borate in this particular procedure. The methods for combining the aqueous slurry of condensed phosphate and aqueous metal borate in this procedure are set forth in the description of the second procedure above except that an aqueous metal borate is substituted for the aqueous metal aluminate in the second procedure.

As stated previously, the condensed metal phosphate hardener, typically in the form of an aqueous dispersion and comprising a core of metal condensed phosphate and a coating on the core of a reaction product of the metallate and acid, is combined with a water-soluble and/or water-dispersible silicate so as to form an aqueous curable composition of the present invention. Water-soluble and/or water-dispersible silicates which may be used in the compositions of the invention include, for example, sodium silicate, potassium silicate and lithium silicate. Preferred aqueous silicates include solutions or dispersions, preferably solutions, of sodium and/or potassium silicates, commonly referred to as waterglasses. Potassium silicate is particularly preferred. Water-soluble and/or water-dispersible alkali metal silicates suitable for the present invention have a $SiO_2:M_2O$ mole ratio generally ranging from about 2.0:1.0 to about 4.0:1.0, preferably from about 3.3:1.0 to about 3.5:1.0, wherein M represents the alkali metal. The amount of silicate glass solids in the compositions of the invention generally ranges from about 10 to about 45 percent, preferably from about 10 to about 32 percent, and most preferably from about 15 to about 25 percent by weight.

Although the above alkali metal silicates are preferred, water-soluble and/or water-dispersible alkali metal silicates which have been modified with an oxide or an hydroxide of a metal such as Al, Ca, Mg, Zr, V, Zn or Cs may be also used as the silicate component. Oxide- or hydroxide-modified silicates may be obtained, for example, by mixing an aqueous solution of the appropriate metal oxide or metal hydroxide with the aqueous silicate and heating the mixture while stirring. Usually, the heating is conducted at about 50° to 100° C. for about 1 to 72 hours. However, if the reaction is conducted in a pressure vessel at a temperature higher than 100° C., the reaction time may be shorter. The amount of oxide or hydroxide may be 0.5 to 3.0 parts by weight per 100 parts by weight (based on dry solids without water of crystallization) of the silicate.

The amount of coated condensed metal phosphate hardener (solids) in aqueous curable compositions of the invention ranges from about 2 to about 32 percent, preferably from about 2 to about 10 percent, and most preferably from about 8 to about 10 percent by weight based on the total weight of the composition. The weight ratio of total alkali metal silicate solids to condensed metal phosphate solids, respectively, in compositions of the invention generally ranges from about 1.0:1.0 to about 10.6:1.0, preferably from about 1.7:1.0 to about 10.6:1.0, and most preferably from about 1.9:1.0 to about 2.6:1.0.

The aqueous curable compositions of the invention are prepared by mixing the water-soluble and/or water-dispersible silicate with the coated condensed metal phosphate hardener. In one embodiment, a water-soluble base is mixed with the aqueous dispersion of condensed phosphate hardener prior to combining the hardener with the silicate. The water-soluble base is mixed with the aqueous dispersion of condensed phosphate hardener until the pH of the mixture is at least 9, preferably greater than 9.5, and most preferably at least 10. A composition of the present invention is then formed by mixing the aqueous dispersion of coated condensed phosphate and the water-soluble and/or water-dispersible silicate while the pH of the dispersion of condensed phosphate is at an appropriate value described above. Examples of bases which may be used to raise the pH of the aqueous dispersion of condensed phosphate include: alkali metal hydroxides such as sodium hydroxide, potassium hydroxide and lithium hydroxide; quaternary ammonium hydroxides such tetraethyl ammonium hydroxide and tetraethanol ammonium hydroxide; ammonia; amines such as triethylamine and 3-(diethylamino)-propan-1-ol; tertiary sulfonium hydroxides such as trimethyl sulfonium hydroxide and triethylsulfonium hydroxide; quaternary phosphonium hydroxides such as tetramethyl phosphonium hydroxide and tetraethyl phosphonium hydroxide; organosilanolates such as tripotassium-$\gamma$-aminopropylsilantriolate, tripotassium N-($\beta$-aminoethyl)-$\gamma$-aminopropylsilantriolate, dipotassium dimethylsilandiolate, potassium trimethylsilanolate, bis-tetramethylammonium dimethylsilandiolate, bis-tetraethylammonium dimethylsilandiolate and tetraethylammonium trimethylsilanolate; and mixtures thereof. Of the bases described above, alkali metal hydroxides, quaternary ammonium hydroxides, ammonia and amines are preferred. The alkali metal hydroxides are particularly preferred.

When a base such as those described immediately above is used in a composition of the present invention, the percent by weight of such base in the composition generally ranges from about 0.2 percent to about 0.8 percent, preferably from about 0.2 percent to about 0.5 percent, based on the total weight of the composition. As discussed previously, the base is mixed with the aqueous dispersion of coated condensed phosphate hardener before the condensed phosphate hardener is admixed with the water-soluble and/or water-dispersible silicate.

As previously stated, aqueous coating compositions of the invention containing water-soluble and/or water-dispersible silicate and coated, metal condensed phosphate also may contain generally known pigments, fillers, additives or mixtures thereof. Examples of suitable pigments include: titanium dioxide, iron oxide red, iron oxide black, manganese black and carbon black. Mixtures of pigments also may be used. A particularly preferred pigment is titanium dioxide coated with alumina available as R-900 from E. I. duPont de Nemours and Company. When desired, pigments to be employed in coating compositions of the invention also may be coated with the reaction product of water-soluble and/or water-dispersible metallate and acid either separately from or concurrently with the metal condensed phosphate. Coating compositions containing such coated pigments would appear to have even longer useful lives (for example 8 days or more) than coating compositions containing silicate, coated, metal condensed phosphate of the invention, and uncoated pigment.

Aqueous coating compositions of the invention containing water-dispersible and/or water soluble silicate and coated, metal condensed phosphate generally have useful lives of at least 8 hours, preferably up to 24 hours and some compositions in excess of 60 hours. By "useful life" of a coating composition is meant the period in which an aqueous coating composition of the invention containing water-soluble and/or water dispersible silicate and coated, metal condensed phosphate remains substantially lump-free and sprayable such that a cured coating is substantially lump-free. Cured coatings prepared from compositions of the invention are resistant to high temperatures, water, detergents and cracking.

Fillers which may be used in the aqueous curable compositions of the invention include inert fillers and/or reinforcing fillers generally known in the art. Examples of such fillers include: silica, mica, clay, sand, glass fibers and steel fibers. The fillers may be incorporated at any stage of the formulation of the compositions of the invention.

Additives which may be used in the aqueous curable compositions of the invention include generally known additives such as dyes, defoamers, release agents, antimar agents, flow control agents, surfactants, thickeners, fungicides and mildewcides. These various additives may be incorporated at any stage in the formulation of the compositions of the invention.

When pigments, fillers, and/or additives previously described, are included in a composition of the invention, they generally may be used in amounts up to 80 percent by volume solids, typically from about 32 percent to about 80 percent by volume solids, and preferably from about 50 percent to about 60 percent by volume solids, based on the total volume of solids present in the compositions.

The aqueous curable compositions of the invention have a variety of applications such as in silicate based cements and especially in silicate based coating compositions. They are particularly useful as coating compositions where high temperature, water and detergent resistance are desired. They may be applied to a wide variety of substrates including, for example, wood, metal, glass, wallboard, cement and the like. Such coating compositions are particularly useful as relatively low temperature curing substitutes for porcelain in appliances. The coating compositions may be applied by any known method including, for example, brushing, dipping, rolling, flow coating, doctor roll coating, spraying and the like. Generally known spray techniques and equipment may be utilized.

Compositions of the invention can be cured at moderate or elevated temperatures. They may be air dried at ambient atmospheric temperatures, but coating compositions so cured are not as water resistant, detergent resistant and crack-free as when cured at moderate or elevated temperatures. Generally, silicate based coating compositions of the invention containing coated, metal condensed phosphate can be cured in relatively short periods of time at temperatures as low as about 100° C., typically as low as about 200° C., to form smooth, substantially lump-free, durable heat-, water-, and detergent-resistant coatings. For example, such a coating composition having a wet film thickness of about 6 mils on a steel substrate, after being air dried, typically can be cured to a durable dry coating of about 3 mils in about 60 minutes or less at about 220° C. or less.

The following examples illustrate the invention. Amounts and percentages are by weight unless specified otherwise. When used herein, "pbw" means "parts by weight."

When used to describe the results of a given test, the word, "passed," means that at the end of the test, the coating shows no evidence of deterioration.

EXAMPLE 1

(Preparation of a Coated, Aluminum Metaphosphate)

(a) An aqueous slurry is prepared from 300 grams (g) of HB hardener available from Pennwalt Company (containing about 80% by weight B-form aluminum metaphosphate and about 20% by weight A-form aluminum metaphosphate), 75 g A-form aluminum metaphosphate, and 600 milliliters (ml) water. The above materials are mixed for about 16 hours in a ball mill to produce a slurry containing 37.5% by weight solids and having a pH of 2.4 at 25° C.

(b) 475 g of the slurry from part (a) immediately above is heated to 90° C. while stirring. Then enough aqueous, 50% by weight sodium hydroxide is added to raise the pH into the range of from 6 to 8.

Next an aqueous 42.5% by weight sodium aluminate solution and an aqueous 96% by weight sulfuric acid solution are simultaneously added dropwise to the slurry while the slurry is stirred and the temperature maintained in the range of from 85° C. to 95° C. The simultaneous dropwise addition of the sodium aluminate and sulfuric acid solutions is carried out so the pH of the slurry is maintained in the range of from 6 to 8. A total of 22.8 ml of the 42.5% sodium aluminate solution is used during the addition.

Then the pH of the slurry is adjusted to within the range of 7.5 to 8. The slurry is then filtered and washed with water until no sulfate ions are detectable through precipitation by an aqueous barium chloride solution. The solid product is dried at 120° C. 189.5 g of dry, coated aluminum metaphosphate is obtained.

EXAMPLE 2

(Preparation of a Curable Coating Composition and a Cured Coating)

(a) An aluminum metaphosphate hardener is prepared by mixing the components set forth in the following TABLE 1.

TABLE 1

| | Parts by Weight |
|---|---|
| Coated aluminum metaphosphate of EXAMPLE 1 | 165.7 |
| Water | 266.9 |
| Aqueous 50% KTPP[1] | 20.9 |
| Strodex PK-90[2] | 3.6 |
| Strodex SEK-50[3] | 6.5 |
| Foamaster VL[4] | 2.3 |

TABLE 1-continued

| | Parts by Weight |
|---|---|
| Attagel 40[5] | 14.7 |
| Micromica C-1000[6] | 94.4 |
| Minusil-10[7] | 20.9 |
| Pigment[8] | 143.6 |

[1]A 50% solution of potassium tripolyphosphate.
[2]A proprietary surfactant available from Dexter Chemicals Corp. containing 90% solids comprising potassium salts of organophosphates.
[3]A proprietary surfactant available from Dexter Chemicals Corp. containing 50% solids comprising potassium salts of organophosphates.
[4]An antifoaming agent available from Diamond Shamrock Corp.
[5]A clay additive available from Englehard Minerals Corp.
[6]Mica available from English Mica Corp.
[7]A silica extender available from PGS Corp.
[8]Shepherd Black #1 available from Shepherd Chemical Co.

The pH of the mixture is then adjusted to 10.5 with 12.7 pbw of an aqueous 50% by weight solution of potassium hydroxide. The resultant material is an aluminum metaphosphate hardener herein designated 2A.

(b) A curable coating composition containing 46.5% solids herein designated 2C is prepared by mixing the components set forth in the following TABLE 2.

TABLE 2

| | Composition 2C (pbw) |
|---|---|
| Hardener 2A | 731.9 |
| Water | 78.8 |
| Aqueous sodium silicate[1] | 698.7 |
| Aqueous potassium silicate[2] | 349.4 |

[1]Contains 37.9% solids; mole ratio of $SiO_2/Na_2O$ = 3.40
[2]Contains 38.8% solids; mole ratio of $SiO_2/K_2O$ = 3.30

The curable composition, 2C, remains liquid and sprayable even after two days.

(c) Several steel panels are sprayed with the curable coating composition, 2C, two days after the composition is prepared. The wet films are essentially lump-free and have a thickness of about 6 mils. The films are allowed to air dry at ambient temperature and then are cured at 220° C. for about 1 hour to durable, essentially lump-free coatings of approximately 3 mils thickness.

The cured coatings on the panels are subjected to the following tests with the indicated results.

The coating on a panel is scored in a cross-hatched configuration and tape is applied to the scored coated surface. Upon ripping the tape quickly from the panel, the coating remains intact thereby exhibiting excellent adhesion to the panel.

After being heated at 538° C. for 1 hour, the coating on another panel shows no evidence of deterioration.

The coating on a panel is scored and the panel is placed in a humidity cabinet at 100% condensing humidity at 37.8° C. according to the ASTM D1735-60T as described in *Paint Testing Manual* by Gardener and Sward, (1962). The coating shows no evidence of deterioration after 1000 hours in the humidity cabinet.

A panel is placed in a 15 gallon detergent tank containing a detergent formulation at 74° C. The detergent formulation contains 505 g sodium tetrapyrophosphate decahydrate, 107.7 g anhydrous sodium sulfate, 39.7 g sodium metasilicate, 5.7 g anhydrous sodium carbonate, 113.4 g sodium alkylarylsulfonate (available from Fisher Scientific Company as S-198) and enough water to fill 15 gallons (56.8 liters). After 500 hours in the detergent tank, the coating shows no evidence of deterioration.

A panel is placed in a 5% by weight salt spray according to ASTM B 117 described in *Paint Testing*

Manual by Gardener and Sward, (1962). The coating shows no evidence of deterioration after 1000 hours at 35° C. in the salt spray.

Another coated panel is submersed in water at 93° C. After about 48 hours in the water the panel shows no evidence of deterioration.

The following EXAMPLE 3 illustrates the invention using an even lighter coating on the aluminum metaphosphate than in EXAMPLE I and the use of phosphoric acid instead of sulfuric acid.

EXAMPLE 3

(Preparation of a Coated, Aluminum Metaphosphate)

(a) An aqueous slurry is prepared from 280 g HB hardener, 70 g A-form aluminum metaphosphate, and 400 ml water by milling the components in a ball mill for 4 hours. When milling is complete, an additional 100 ml water is added to the mixture to produce a slurry containing 41.1% by weight solids and having a pH of 2.7.

(b) Two, separate 425 g portions of the slurry of part (a) immediately above, herein designated 3S and 3S' respectively, are each heated to 90° C. while stirring. Then enough aqueous, 50% by weight sodium hydroxide is added to each slurry to raise the pH into the range of from 6 to 8.

While stirring portion 3S and maintaining the temperature at 90°±4° C., 6.7 g (4.3 ml) of aqueous 42.5% by weight sodium aluminate and also aqueous 85% by weight phosphoric acid simultaneously are added dropwise. The pH is maintained in the range of 6 to 8 during the dropwise addition. The phosphoric acid addition is stopped just before the addition of sodium aluminate is stopped, and the remaining several drops of sodium aluminate are added to adjust the pH to 7.5. Portion 3S is then cooled. The resultant composition herein designated 3A contains 32.6 percent by weight solids and has a pH after cooling to 20° C. of 6.8.

Portion 3S' is treated in the same manner as portion 3S above except that 17.0 g (11.0 ml) of aqueous 42.5% by weight sodium aluminate is used. The resultant composition, herein designated 3A', contains 31.1% by weight solids and has a pH after cooling to 20° C. of 6.3.

EXAMPLE 4

(Preparation of Two Curable Coating Compositions and Two Cured Coatings Therefrom)

(a) Two aluminum metaphosphate hardeners herein designated 4A and 4A' respectively are prepared by mixing the components set forth in the following TABLE 3.

TABLE 3

| | Hardener 4A (pbw) | Hardener 4A' (pbw) |
|---|---|---|
| Coated aluminum metaphosphate, 3A, of Example 3(b) | 531.8 | — |
| Coated aluminum metaphosphate, 3A', of Example 3(b) | — | 519.1 |
| Aqueous 50% KTPP* | 10.5 | 10.5 |
| Strodex PK-90* | 7.3 | 7.3 |
| Foamaster VL* | 2.3 | 2.3 |
| Attagel 40* | 14.7 | 14.7 |
| Micromica C-1000* | 47.2 | 47.2 |
| Minusil-10* | 20.9 | 20.9 |
| TiO$_2$ pigment** | 110.6 | 110.6 |

*Described in EXAMPLE 2(a).
**A titanium dioxide pigment coated with alumina available as R-900 from E. I. duPont de Nemours and Company.

(b) Hardener 4A is mixed with 2.28 pbw aqueous 50% by weight potassium hydroxide to a pH of 10.4. Then a curable coating composition containing 44.2% by weight solids, herein designated 4C, is prepared by mixing the components set forth in the following TABLE 4.

In a similar manner, hardener 4A' is mixed with 3.8 pbw aqueous 50% by weight potassium hydroxide to a pH of 10.5. Then a curable coating composition containing 43.9% by weight solids, herein designated 4C', is prepared by mixing the components set forth in the following TABLE 4.

TABLE 4

| | Composition 4C (pbw) | Composition 4C' (pbw) |
|---|---|---|
| Hardener 4A | 747.6 | — |
| Hardener 4A' | — | 736.4 |
| Water | 32.1 | 32.1 |
| Aqueous sodium silicate* | 698.7 | 698.7 |
| Aqueous potassium silicate* | 349.4 | 349.4 |
| Micromica C-3000** | 47.2 | 47.2 |

*Described in EXAMPLE 2(b)
**Mica available from English Mica Corp.

(c) Several steel panels, collectively designated PC, are sprayed to a wet film thickness of about 6 mils with coating composition 4C shortly after composition 4C is prepared. The wet films are essentially lump-free.

Several steel panels, collectively designated P$_{24}$C, are sprayed to a wet film thickness of about 6 mils with coating composition 4C twenty-four hours after composition 4C is prepared. The wet films are essentially lump-free.

Several steel panels, collectively designated PC', are sprayed to a wet film thickness of about 6 mils with coating composition 4C' shortly after composition 4C' is prepared. The wet films are essentially lump free.

The coating compositions on all of the panels PC, P$_{24}$C, and PC' are allowed to air dry and then are cured for about 1 hour at 220° C. to smooth, essentially lump free coatings having a thickness of about 3 mils. Panels from each group are subjected to the following heat, 100% condensing humidity, detergent, 5% salt spray, and water soak tests are described in EXAMPLE 2(c). These tests are performed as in EXAMPLE 2(c) except where specifically indicated otherwise. The results are given in the following TABLE 5.

TABLE 5

| TEST | PC | P$_{24}$C | PC' |
|---|---|---|---|
| 1 hour at 538° C. | passed | passed | passed |
| 1000 hours in 100% condensing humidity at 37.8° C. | passed | passed | passed |
| 250 hours in detergent tank at 74° C. | passed | passed | passed |
| 500 hours in 5% salt spray at 35° C. | passed | passed | passed |
| 24 hours in water at 93° C. | passed | passed | passed |

Comparison of the above results for panels from groups PC and P$_{24}$C illustrates that this coating composition sprayed after even 24 hours from preparation cures to a durable, lump-free coating as does the same coating composition sprayed a short time after preparation.

The following EXAMPLE 5 illustrates the invention wherein no additional acid is used in the preparation of the coated, aluminum metaphosphate.

EXAMPLE 5

(Preparation of a Coated, Aluminum Metaphosphate.)

(a) An aqueous slurry is prepared from 600 g of HB hardener available from Pennwalt Company (containing about 80% by weight B-form aluminum metaphosphate and about 20% by weight A-form aluminum metaphosphate), 150 g of A-form aluminum metaphosphate, and 1000 ml of water. The above materials are mixed for about 16 hours in a ball mill to produce a slurry containing 45.2% by weight solids and having a pH of about 2.3 at about room temperature.

(b) With 1517 g of the slurry from part (a) immediately above is mixed 525.7 g of Shepherd Brown #20 (a pigment available from the Shepherd Chemical Company) to form a pigmented slurry.

(c) Next, 2042.7 g of the pigmented slurry from part (b) immediately above is heated while intermittantly adding distilled water. The intermittant addition of the water is stopped after a total of 200 ml of water has been added and the temperature of the pigmented slurry has reached about 85° C. Then 8.1 ml of aqueous, 50% by weight potassium hydroxide is added to raise the pH of the pigmented slurry to about 6 while the temperature is allowed to rise to about 90° C.

Next, 314.7 g of an aqueous sodium aluminate solution (containing 41.2% by weight sodium aluminate) is slowly added dropwise to the pigmented slurry while the slurry is stirred and the temperature maintained in the range of from 85° C. to 95° C. After the addition of the aqueous sodium aluminate has been completed, stirring of the pigmented slurry is continued while the temperature of the slurry is allowed to fall to room temperature. The resultant composition, herein designated 5A, containing coated aluminum metaphosphate has a 58.7% by weight solids content and a pH of 7.2.

EXAMPLE 6

(Preparation of a Curable Coating Composition and a Cured Coating Therefrom)

(a) An aluminum metaphosphate hardener herein designated 6A is prepared by mixing the components set forth in the following TABLE 6.

TABLE 6

|  | Hardener 6A (pbw) |
| --- | --- |
| Composition 5A of EXAMPLE 5(c) | 451.9 |
| Water | 68.1 |
| Aqueous 50% KTPP* | 20.0 |
| Strodex PK-90* | 3.5 |
| Strodex SEK-50* | 6.2 |
| Foamaster VL* | 2.3 |
| Attagel 40* | 14.0 |
| Micromica C-1000* | 45.0 |
| Minusil-10* | 20.0 |

*Described in EXAMPLE 2(a).

(b) Three hundred parts by weight of hardener 6A is mixed with sufficient aqueous 50% by weight potassium hydroxide to raise the pH of hardener 6A to about 9.5

Next a curable coating composition containing 46% by weight solids, herein designated 6C, is prepared by mixing the components set forth in the following TABLE 7.

TABLE 7

|  | Composition 6C (pbw) |
| --- | --- |
| Hardener 6A of EXAMPLE 6(b) | 300 |
| Water | 20.8 |
| Aqueous sodium silicate* | 257.6 |
| Aqueous potassium silicate* | 128.8 |
| Micromica C-3000** | 21.6 |

*Described in EXAMPLE 2(b)
**Mica available from English Mica Corp.

(c) A steel panel is sprayed to a wet film thickness of about 6 mils with coating composition 6C shortly after composition 6C is prepared. The wet film is essentially lump-free.

The coating composition is allowed to air dry and then is cured at 220° C. for 1 hour to a smooth, substantially lump-free coating having a thickness of about 3 mils.

EXAMPLE 7

(Preparation of a Coated, Aluminum Metaphosphate)

(a) An aqueous slurry is prepared containing 24.3% by weight HB hardener, 6.2% by weight A-form aluminum metaphosphate, 23.0% by weight Shepherd Brown #20 and 45.8% by weight water by milling the components in a ball mill for about 16 hours.

(b) An aqueous solution of sodium metaborate is prepared by dissolving 50 g of sodium metaborate, $Na_2B_2O_4 \cdot 8H_2O$, in 100 ml of water. 750 g of the slurry from part (a) immediately above is heated to a temperature in the range of 85° C. to 90° C. Then enough of the aqueous sodium metaborate solution is added to the slurry to initially raise the pH into the range of from 6 to 8. Next the aqueous sodium metaborate solution and an aqueous, 85% by weight phosphoric acid solution are simultaneously added dropwise to the slurry over a period of about 15 minutes while the slurry is stirred and the temperature maintained at about 85° C. The simultaneous dropwise addition is carried out so as to maintain the pH of the slurry in the range of about 6 to 8. The phosphoric acid addition is stopped just before the addition of the sodium metaborate is stopped, and the remaining several drops of sodium metaborate are added to adjust the pH to 7.5. A total of 12.2 g of the aqueous, 85% by weight phosphoric acid solution is used during the simultaneous addition. All 50 g of the sodium metaborate is used during the described initial pH adjustment and simultaneous dropwise addition. The resultant composition, herein designated 7A, contains 51.6% by weight solids and has a pH after cooling to about 22° C. of 7.1.

EXAMPLE 8

(Preparation of a Curable Coating Composition and a Cured Coating Therefrom)

(a) An aluminum metaphosphate hardener, herein designated 8A, is prepared by mixing the components set forth in the following TABLE 8.

TABLE 8

|  | Hardener 8A (pbw) |
| --- | --- |
| Coated aluminum metaphosphate, 7A, of Example 7(b) | 264.0 |
| Aqueous 50% KTPP* | 9.2 |
| Strodex PK-90* | 7.3 |
| Strodex SEK-50 | 2.8 |

TABLE 8-continued

|  | Hardener 8A (pbw) |
|---|---|
| Foamaster VL* | 1.1 |
| Minusil-10* | 9.2 |
| Micromica C-100* | 41.8 |

*Described in EXAMPLE 2(a).

(b) Hardener 8A is mixed with 10.2 pbw aqueous, 50% by weight potassium hydroxide to a pH of 9.8. Next a curable coating composition, herein designated 8C, is prepared by mixing the components set forth in the following TABLE 9.

TABLE 9

|  | Composition 8C (pbw) |
|---|---|
| Hardener 8A of Example 8(b) | 339.9 |
| Water | 10.9 |
| Aqueous sodium silicate[1] | 247.2 |
| Micromica C-3000[2] | 10.2 |
| Attagel 40[3] | 6.8 |

[1]Described in EXAMPLE 2(b).
[2]Described in EXAMPLE 4(b).
[3]Described in EXAMPLE 2(a).

(c) Several steel panels, collectively designated $PC_0$, are sprayed to a wet film thickness of about 6 mils with coating composition 8C shortly after composition 8C is prepared. The wet films contain a few lumps which, however, decrease considerably in size upon air drying. After allowing the films to air dry at ambient temperature, the coating compositions are cured for about 1 hour at 220° C. to coatings having a thickness of about 3 mils and containing a few small lumps more appropriately characterized as small grains.

Several steel panels, collectively designated $PC_{24}$, are sprayed to a wet film thickness of about 6 mils with coating composition 8C about 24 hours after composition 8C is prepared. The wet films are substantially lump-free. These coating compositions are allowed to air dry at ambient temperature and then are cured for about 1 hour at 220° C. to substantially lump-free coatings having a thickness of about 3 mils.

Panels from each group are subjected to the following heat, 100% condensing humidity, detergent, 5% salt spray, and water soak tests as described in EXAMPLE 2(c). These tests are performed as in EXAMPLE 2(c) except where specifically indicated otherwise. The test results are given in the following TABLE 10.

TABLE 10

| TEST | $PC_0$ | $PC_{24}$ |
|---|---|---|
| 1 hour at 538° C. | passed | passed |
| 575 hours in 100% condensing humidity at 37.8° C. | passed | passed |
| Detergent tank at 74° C. | failed at about 150 hours | failed at about 150 hours |
| 5% salt spray at 35° C. | failed at about 350 hours | failed at about 350 hours |
| 24 hours in boiling water | passed | passed |

The above results illustrate that this coating composition sprayed after even 24 hours from preparation cures to a reasonably durable, substantially lump-free coating.

The following EXAMPLE 9 illustrates the invention using a water-dispersible rather than a water-soluble metal aluminate.

EXAMPLE 9

(Preparation of a Coated, Aluminum Metaphosphate)

(a) 200 g of essentially insoluble calcium aluminate, $CaAl_2O_4$, is milled in a ball mill with sufficient water to produce a paste-containing 30.5% by weight solids.

An aqueous slurry is prepared containing 24.3% by weight HB hardener, 6.2% by weight A-form aluminum metaphosphate, 23.7% by weight Shepherd Brown #20 and 45.8% by weight water by milling the components in a ball mill for about 16 hours.

750 g of the aqueous slurry is placed in a steel beaker fitted with an air motor attached to a high lift blade, a heating element, and pH and temperature probe. The slurry is agitated and heated to a temperature of about 60° C. at which temperature 2 ml of an aqueous, 50% by weight solution of potassium hydroxide is added so as to increase the fluidity of the slurry. Next the slurry is heated to 85° C. at which point addition of the calcium aluminate paste is begun. The calcium aluminate paste is added to the slurry over a period of 10 minutes while the pH is maintained in a range of from 7 to 8 by the simultaneous addition of a small amount of aqueous, 85% by weight phosphoric acid. When the addition of calcium aluminate paste and phosphoric acid is complete, the total amount of the calcium aluminate paste added to the slurry is 63.9 g, the total amount of 85% by weight phosphoric acid added is 2.7 g, and the pH at about 85° C. is 7.6. Agitation of the slurry is continued while the slurry is allowed to cool to about room temperature. The resulting composition containing coated aluminum metaphosphate is herein designated 9A.

EXAMPLE 10

(Preparation of a Curable Coating Composition and a Cured Coating Therefrom)

(a) An aluminum metaphosphate hardener, herein designated 10A, is prepared by mixing the components set forth in the following TABLE 11.

TABLE 11

|  | Hardener 10A (pbw) |
|---|---|
| Coated aluminum metaphosphate, 9A, of Example 9(b) | 233.1 |
| Water | 25.0 |
| Strodex PK-9* | 1.6 |
| Strodex SEK-50* | 2.8 |
| Foamaster VL* | 1.1 |
| Minusil-10* | 9.2 |
| Micromica C-1000* | 41.8 |

*Described in EXAMPLE 2(a).

(b) Hardener 10A is mixed with 6.3 pbw aqueous, 50% by weight potassium hydroxide to raise the pH to 9.8. Next a curable coating composition, herein designated 10C, is prepared by mixing the component set forth in the following TABLE 12.

TABLE 12

|  | Composition 10C (pbw) |
|---|---|
| Hardener 10A of Example 10(b) | 320.9 |
| Water | 10.0 |
| Aqueous sodium silicate* | 247.2 |
| Aqueous potassium silicate* | 123.6 |
| Micromica C-3000** | 10.2 |

TABLE 12-continued

|  | Composition 10C (pbw) |
|---|---|
| Attagel 40** | 9.1 |

*Described in EXAMPLE 2(b).
**Described in EXAMPLE 4(b).
***Described in EXAMPLE 2(a).

Several steel panels, collectively designated $_0$PC are sprayed to a wet film thickness of about 6 mils with coating composition 10C shortly after composition 10C is prepared. The wet films are smooth and essentially lump-free. The films are allowed to air dry at ambient temperature and then are cured at about 220° C. for about one hour to durable, essentially lump-free coatings of approximately 3 mils thickness.

Several steel panels, collectively designated PC$_{60+}$, are sprayed with coating compositions 10C after 60 hours from when coating composition 10C is prepared. The films are allowed to air dry at ambient temperature and then are cured at 220° C. for about 1 hour to durable, essentially lump-free coatings of approximately 2.5 mils thickness.

Panels from each group are subjected to the following heat, 100% condensing humidity, detergent, 5% salt spray, and water soak tests as described in EXAMPLE 2(c). These tests are performed as in EXAMPLE 2(c) except where specifically indicated otherwise. The test results are given in the following TABLE 13.

TABLE 13

| TEST | $_0$PC | PC |
|---|---|---|
| 1 hour at 538° C. | passed | passed |
| 575 hours in 100% condensing humidity at 37.8° C. | passed | passed |
| 575 hours in detergent tank at 74° C. | passed | failed at about 50 hours |
| 575 hours in 5% salt spray at 35° C. | passed | passed |
| 24 hours in boiling water | passed | passed |

Comparison of the above results for panels from groups $_0$PC and PC$_{60+}$ illustrates that this coating composition containing hardener prepared using water-dispersible calcium aluminate when sprayed after even 60 hours from preparation cures to a durable, lump-free coating as does the same coating composition sprayed a short time after preparation.

What is claimed is:

1. An aqueous curable composition comprising:
   (A) a water-soluble and/or water-dispersible silicate;
   (B) a metal condensed phosphate hardener, said metal condensed phosphate hardener comprising a core of metal condensed phosphate and a coating on said core comprising a reaction product of acid and a metallate selected from the group consisting of metal aluminate, metal borate and a mixture thereof; and
   (C) water.

2. The composition of claim 1 wherein said metallate comprises a water-soluble metallate.

3. The composition of claim 2 wherein said water-soluble metallate comprises a water-soluble metal aluminate.

4. The composition of claim 1 wherein said water-soluble and/or water-dispersible silicate in said composition is in an amount ranging from about 10 percent to about 45 percent by weight solids based on the total weight of said composition.

5. The composition of claim 1 wherein said metal condensed phosphate hardener in said composition is in an amount ranging from about 2 percent to about 32 percent by weight solids based on the total weight of said composition.

6. The composition of claim 1 wherein said reaction product is in an amount ranging from about 0.1 percent to about 50 percent by weight based on the combined weight of said metal condensed phosphate and said reaction product.

7. The composition of claim 1 wherein said core of metal condensed phosphate comprises a condensed metal metaphosphate.

8. The composition of claim 7 wherein said condensed metal metaphosphate comprises a linear condensed aluminum metaphosphate.

9. The composition of claim 7 wherein said condensed metal metaphosphate comprises a mixture of B-form condensed aluminum metaphosphate and A-form condensed aluminum metaphosphate.

10. The composition of claim 9 wherein the ratio by weight of B-form condensed aluminum metaphosphate to A-form condensed aluminum metaphosphate in said mixture ranges from about 3:5 to about 4:1.

11. The composition of claims 1 or 8 wherein said silicate comprises an alkali metal silicate having a $SiO_2$:$M_2O$ mole ratio of about 2.0:1.0 to about 4.0:1.0 wherein M represents an alkali metal.

12. The composition of claim 11 further comprising a pigment, a filler, and additive or a mixture thereof.

13. The composition of claim 11 wherein said silicate in said composition is in an amount ranging from about 10 percent to about 32 percent by weight solids based on the total weight of said composition; said metal condensed phosphate hardener in said composition is on an amount ranging from about 2 percent to about 10 percent by weight solids based on the total weight of said composition; said reaction product is in an amount ranging from about 1 percent to about 15 percent by weight based on the combined weight of said metal condensed phosphate and said reaction product; and said metallate comprises a water-soluble metal aluminate.

14. The composition of claim 12 wherein said metal condensed phosphate hardener is in the form of an aqueous dispersion, said aqueous dispersion containing a water-soluble base in an amount such that the pH of said aqueous dispersion is at least 9.

15. The composition of claim 14 further comprising a pigment, a filler, an additive or a mixture thereof.

16. A method of producing an aqueous curable composition comprising mixing:
   (A) from about 10 percent to about 45 percent by weight of a water-soluble and/or water-dispersible silicate;
   (B) from about 2 to about 32 percent by weight of a metal condensed phosphate hardener, said metal condensed phosphate hardener comprising a core of condensed metal phosphate and a coating on said core comprising a reaction product of acid and a metallate selected from the group consisting of metal aluminate, metal borate and a mixture thereof; and
   (C) water.

17. The method of claim 15 wherein said metallate comprises a water-soluble metallate.

18. The method of claim 17 wherein said water-soluble metallate comprises a water-soluble metal aluminate.

19. The method of claim 18 wherein said reaction product is in an amount ranging from about 0.1 percent to about 50 percent by weight based on the combined weight of said metal condensed phosphate and said reaction product.

20. The method of claim 18 in which said silicate is an alkali metal silicate having an $SiO_2:M_2O$ mole ratio of about 2.0:1.0 to about 4.0:1.0 wherein M represents an alkali metal; said silicate in said composition is in an amount ranging from about 10 percent to about 32 percent by weight solids based on the total weight of said composition; said metal condensed phosphate hardener in said composition is in an amount ranging from about 2 percent to about 10 percent by weight solids based on the total weight of said composition; said reaction product is in an amount ranging from about 1 percent to about 15 percent by weight based on the combined weight of said metal condensed phosphate and said reaction product; and said metal condensed phosphate comprises a linear condensed aluminum metaphosphate.

21. The method of claim 20 wherein said metal condensed phosphate hardener is in the form of an aqueous dispersion, said aqueous dispersion containing a water-soluble base in an amount such that the pH of said aqueous dispersion is at least 9.

* * * * *